US008867478B2

(12) United States Patent
Nayeb Nazar et al.

(10) Patent No.: US 8,867,478 B2
(45) Date of Patent: Oct. 21, 2014

(54) METHOD AND APPARATUS FOR CHANNEL RESOURCE MAPPING IN CARRIER AGGREGATION

(75) Inventors: Shahrokh Nayeb Nazar, Montreal (CA); Kyle Jung-Lin Pan, Smithtown, NY (US); Robert L. Olesen, Huntington, NY (US); Allan Y. Tsai, Boonton, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 523 days.

(21) Appl. No.: 12/986,407

(22) Filed: Jan. 7, 2011

(65) Prior Publication Data

US 2011/0170499 A1 Jul. 14, 2011

Related U.S. Application Data

(60) Provisional application No. 61/293,540, filed on Jan. 8, 2010, provisional application No. 61/307,721, filed on Feb. 24, 2010.

(51) Int. Cl.
*H04W 4/00* (2009.01)
*H04L 1/18* (2006.01)
*H04L 5/00* (2006.01)

(52) U.S. Cl.
CPC ............ *H04L 5/0053* (2013.01); *H04L 1/1861* (2013.01); *H04L 5/0007* (2013.01); *H04L 1/1812* (2013.01); *H04L 5/001* (2013.01); *H04L 5/0023* (2013.01); *H04L 5/0055* (2013.01)
USPC ......................................................... 370/330

(58) Field of Classification Search
USPC .................. 370/277–278, 280–282, 310–348
See application file for complete search history.

(56) References Cited

U.S. PATENT DOCUMENTS

| 2009/0175233 A1 * | 7/2009 | Ojala et al. ..................... 370/329 |
| 2009/0196240 A1 * | 8/2009 | Frederiksen et al. ......... 370/329 |
| 2009/0268685 A1 * | 10/2009 | Chen et al. ..................... 370/329 |
| 2010/0113050 A1 * | 5/2010 | Cheng et al. .................. 455/450 |

(Continued)

FOREIGN PATENT DOCUMENTS

| WO | WO 2009044344 A2 * | 4/2009 |
| WO | WO 2009087529 A1 * | 7/2009 |
| WO | 2010/136399 | 12/2010 |

OTHER PUBLICATIONS

Alcatel-Lucent et al., "PHICH Design for Aggregated Carriers in LTE-A," R1-093766, 3GPP TSG-RAN WG1 #58bis, Miyazaki, Japan, Oct. 12-16, 2009

(Continued)

*Primary Examiner* — Kwang B Yao
*Assistant Examiner* — Juvena Loo
(74) *Attorney, Agent, or Firm* — Volpe and Koenig, P.C.

(57) ABSTRACT

Methods and apparatus for preventing physical hybrid automatic repeat request (HARQ) indicator channel (PHICH) ambiguities or collisions, for example, in a multi-carrier system or when transmitting multiple streams over multiple antennas, are described. Methods may include dividing resources or groups among multiple component carriers (CCs), using and assigning unused or vacant resources to CCs, forcing usage of adaptive HARQ processes in specified scenarios, setting a value for the cyclic shift of the corresponding uplink demodulation reference signals (DMRS) to a previous value for semi-persistent scheduling, and assigning a different first resource block for semi-persistent scheduling uplink resources and random access response grants for multiple CCs.

6 Claims, 8 Drawing Sheets

(56) References Cited

U.S. PATENT DOCUMENTS

| | | | | |
|---|---|---|---|---|
| 2010/0118746 A1* | 5/2010 | Gerlach | | 370/281 |
| 2010/0150082 A1* | 6/2010 | Shin et al. | | 370/329 |
| 2010/0172290 A1* | 7/2010 | Nam et al. | | 370/328 |
| 2010/0172308 A1* | 7/2010 | Nam et al. | | 370/329 |
| 2010/0195583 A1* | 8/2010 | Nory et al. | | 370/329 |
| 2011/0310856 A1* | 12/2011 | Hariharan et al. | | 370/336 |

OTHER PUBLICATIONS

Alcatel-Lucent et al., "PHICH Resource Allocation in LTE-A," R1-104075, 3GPP TSG-RAN WG1 #61bis, Dresden, Germany, Jun. 28-Jul. 2, 2010.
Alcatel-Lucent et al., "Way Forward on PDCCH for Bandwidth Extension in LTE-A," R1-093699, 3GPP TSG RAN WG1 Meeting #58, Shenzhen, China, Aug. 24-28, 2009.
CATT, "PHICH for LTE-A," R1-094674, 3GPP TSG RAN WG1 Meeting #59, Jeju, Korea, Nov. 9-13, 2009.
Ericsson, St-Ericsson, "On PHICH for Carrier Aggregation," R1-101725, 3GPP TSG-RAN WG1 #60bis, Bejing, China, Apr. 12-16, 2010.
Ericsson, St-Ericsson, "PHICH for Carrier Aggregation," R1-094272, 3GPP TSG-RAN WG1 #58bis, Miyazaki, Japan, Oct. 12-16, 2009.
Huawei, "PHICH Consideration in LTE-Advanced," R1-093836, 3GPP TSG RAN WG1 Meeting #58bis, Miyazaki, Oct. 12-16, 2009.
Motorola, "PHICH for Carrier Aggregation," R1-093985, 3GPP TSG RAN1 #58-Bis, Miyazaki, Japan, Oct. 12-16, 2009.
Nokia, Nokia Siemens Networks, "PHICH in LTE-Advanced," R1-093901, 3GPP TSG RAN WG1 Meeting #58bis, Miyazaki, Japan, Oct. 12-16, 2009.
Qualcomm Europe, "PHICH for Multicarrier Operation," R1-094205, 3GPP TSG RAN WG1 #58bis, Miyazaki, Japan, Oct. 12-16, 2009.
Samsung, "PHICH Mapping in Asymmetric Carrier Aggregation," R1-094080, 3GPP TSG RAN WG1 Meeting #58bis, Miyazaki, Japan, Oct. 12-16, 2009.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," 3GPP TS 36.300 v8.11.0, Dec. 2009.
Third Generation Partnership Project, "Technical Specification Group Radio Access Network; Evolved Universal Terrestrial Radio Accesss (E-UTRA) and Evolved Universal Terrestrial Radio Access Network (E-UTRAN); Overall Description; Stage 2 (Release 8)," 3GPP TS 36.300 v8.12.0, Apr. 2010.
Third Generation Partnership Project, "Technical Specification Group Radio Access Network; Evolved Universal Terrestrial Radio Access (E-UTRA) and Evolved Universal Radio Access Network (E-UTRAN); Overall Description; Stage 2 (Release 9)," 3GPP TS 36.300 v9.2.0, Jan. 2010.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 9)," 3GPP TS 36.300 v9.6.0, Dec. 2010.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)," 3GPP TS 36.300 v10.2.0, Dec. 2010.
Third Generation Partnership Project, "Technical Specification Group Radio Access Network; Evolved Universal Terestrial Radio Access (E-UTRA); Medium Access Control (MAC) Protocol Specification (Release 8)," 3GPP TS 36.321 v8.8.0, Dec. 2009.
Third Generation Partnership Project, "Technical Specification Group Radio Access Network; Evolved Universal Terrestrial Radio Access (E-UTRA); Medium Access Control (MAC) Protocol Specification (Release 8)," 3GPP TS 36.321 v8.9.0, Jun. 2010.
Third Generation Partnership Project, "Technical Specification Group Radio Access Network; Evolved Universal Terrestrial Radio Access (E-UTRA); Medium Access Control (MAC) Protocol Specification (Release 9)," 3GPP TS 36.321 v9.1.0, Jan. 2010.
Third Generation Partnership Project, "Technical Specification Group Radio Access Network; Evolved Universal Terrestrial Radio Access (E-UTRA); Medium Access Control (MAC) Protocol Specification (Release 9)," 3GPP TS 36.321 v9.3.0, Jun. 2010.
Third Generation Partnership Project, "Technical Specification Group Radio Access Network; Evolved Universal Terrestrial Radio Access (E-UTRA); Medium Access Control (MAC) Protocol Specification (Release 10)," 3GPP TS 36.321 v10.0.0, Dec. 2010.
Third Generation Partnership Project, "Technical Specification Group Radio Access Network; Evolved Universal Terrestrial Radio Access (E-UTRA); Physical Channels and Modulation (Release 8)," 3GPP TS 36.211 v8.9.0, Dec. 2009.
Third Generation Partnership Project, "Technical Specification Group Radio Access Network; Evolved Universal Terrestrial Radio Access (E-UTRA); Physical Channels and Modulation (Release 9)," 3GPP TS 36.211 v9.0.0, Dec. 2009.
Third Generation Partnership Project, "Technical Specification Group Radio Access Network; Evolved Universal Terrestrial Radio Access (E-UTRA); Physical Channel and Modulation (Release 9)," 3GPP TS 36.211 v9.1.0, Mar. 2010.
Third Generation Partnership Project, "Technical Specification Group Radio Access Network; Evolved Universal Terrestrial Radio Access (E-UTRA); Physical Channels and Modulation (Release 10)," 3GPP TS 36.211 V10.0.0, Dec. 2010.
Third Generation Partnership Project, "Technical Specification Group Radio Access Network; Evolved Universal Terrestrial Radio Access (E-UTRA); Physical Layer Procedures (Release 8)," 3GPP TS 36.213 v8.8.0, Sep. 2009.
Third Generation Partnership Project, "Technical Specification Group Radio Access Network; Evolved Universal Terrestrial Radio Access (E-UTRA); Physical Layer Procedures (Release 9)," 3GPP TS 36.213 v9.0.1, Dec. 2009.
Third Generation Partnership Project, "Technical Specification Group Radio Access Network; Evolved Universal Terrestrial Radio Access (E-UTRA); Physical Layer Procedures (Release 10)," 3GPP TS 36.213 v10.0.1, Dec. 2010.
Third Generation Partnership Project, "Technical Specification Group Radio Access Network; Further Advancements for E-UTRA Physical Layer Aspects (Release 9)," 3GPP TR 36.814 v1.5.0, Nov. 2009.
Third Generation Partnership Project, "Technical Specification Group Radio Access Network; Further Advancements for E-UTRA Physical Layer Aspects (Release 9)," 3GPP TR 36.814 v9.0.0, Mar. 2010.
Ericsson, "Summary of email discussion on DL control signaling," TSG-RAN WG1 #51bis, R1-080342, Sevilla, Spain (Jan. 14-18, 2008).
ZTE, "PHICH Resource Mapping in TDD," 3GPP TSG-RAN WG1 #52bis, R1-081410, Shen Zhen, China (Mar. 31-Apr. 4, 2008).

* cited by examiner

US 8,867,478 B2

METHOD AND APPARATUS FOR CHANNEL RESOURCE MAPPING IN CARRIER AGGREGATION

CROSS REFERENCE TO RELATED APPLICATIONS

This application claims the benefit of U.S. provisional application Nos. 61/293,540 filed Jan. 8, 2010 and 61/307,721 filed Feb. 24, 2010, the contents of which are hereby incorporated by reference herein.

FIELD OF THE INVENTION

This application is related to wireless communications.

BACKGROUND

In Long Term Evolution (LTE) Release 8 (R8), a base station may configure a wireless transmit/receive unit (WTRU) with downlink (DL) and uplink (UL) resources on a single DL carrier and a single UL carrier, respectively. In LTE R8, the uplink (UL) Hybrid Automatic Repeat Request (HARQ) mechanism may perform retransmissions of missing or erroneous data packets transmitted by the WTRU. The UL HARQ functionality may span across both the physical (PHY) layer and the Medium Access Control (MAC) layer. The WTRU receives acknowledgments/negative acknowledgments (ACK/NACKs) on the physical HARQ indicator channel (PHICH). That is, the PHICH may be used by a base station for transmission of HARQ feedback, (ACK or NACK), in response to Uplink Shared Channel (UL-SCH) transmissions.

User multiplexing in LTE R8 may be performed by mapping multiple PHICHs on the same set of resource elements (REs) which constitute a PHICH group. PHICHs within the same PHICH group are separated through different orthogonal Walsh sequences. In order to lower the control signalling overhead, the PHICH index pair may be implicitly associated with the index of the lowest uplink resource block used for the corresponding physical uplink shared channel (PUSCH) transmission and the cyclic shift of the corresponding uplink demodulation reference signal. The association of PHICH resources and the cyclic shifts enable the allocation of the same time and frequency resource to several WTRUs in support of uplink Multi-User Multiple Input Multiple Output (MU-MIMO). In LTE R8, there are no ambiguities or PHICH collisions, (as a result of using the same RBs), since the downlink (DL) and uplink (UL) resources are associated with a single DL carrier and a single UL carrier, respectively.

In multi-carrier wireless systems, the WTRU may be assigned or configured with multiple component carriers (CCs), such as for example, with at least one DL component carrier and at least one UL component carrier. The WTRU may be configured to aggregate a different number of CCs of possibly different bandwidths in the UL and the DL. A one-to-one relationship between the DL CC and the UL CC may not exist in multi-carrier wireless systems. In fact, multi-carrier wireless systems may use cross-carrier scheduling, where for example, a DL CC may carry information pertinent to multiple UL CCs.

Cross-carrier scheduling may include cross-carrier PHICH resource allocation. In these systems, a PHICH may be transmitted on one DL CC that may be associated with multiple UL CCs. If the PHICH is linked to two or more PUSCHs, then application of the LTE R8 PHICH parameter selection for resources may lead to ambiguities and collisions.

PHICH collisions may also occur with respect to spatial multiplexing. In spatial multiplexing, multiple transport blocks may be transmitted using multiple antennas using an identical first physical resource block (PRB) index. In other words, multiple layers of signaling or multiple streams may be transmitted over multiple antennas using the same PRB index. Therefore, given that each stream needs a corresponding ACK/NACK, the issues related to PHICH collisions stated above with respect to multiple CCs are applicable to spatial multiplexing.

SUMMARY

Methods and apparatus for preventing physical hybrid automatic repeat request (HARQ) indicator channel (PHICH) ambiguities or collisions, for example, in a multi-carrier system or when transmitting multiple streams over multiple antennas, are described. Methods may include dividing resources or groups among multiple component carriers (CCs), using and assigning unused or vacant resources to CCs, forcing usage of adaptive HARQ processes in specified scenarios, setting a value for the cyclic shift of the corresponding uplink demodulation reference signals (DMRS) to a previous value for semi-persistent scheduling, and assigning a different first resource block for semi-persistent scheduling uplink resources and random access response grants for multiple CCs.

BRIEF DESCRIPTION OF THE DRAWINGS

A more detailed understanding may be had from the following description, given by way of example in conjunction with the accompanying drawings wherein.

DETAILED DESCRIPTION

Figure 1A:
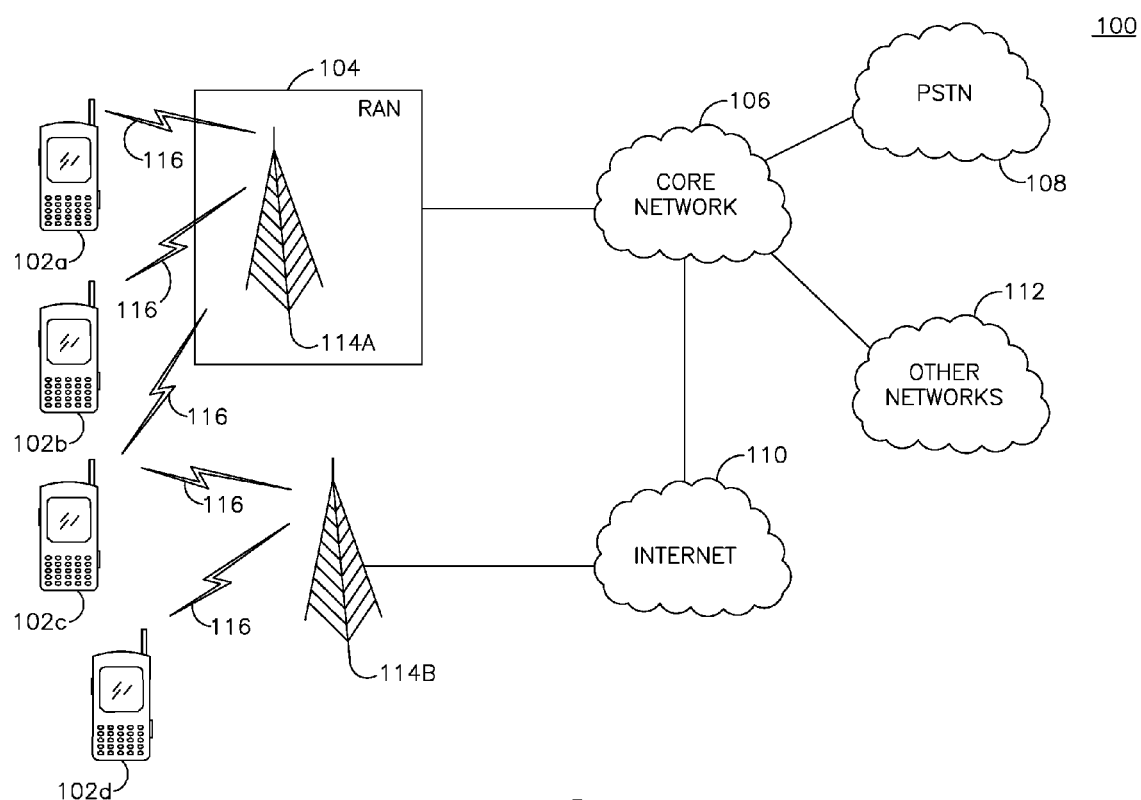
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a touchpad, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over air interface(s) 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In other embodiments, the base station 114a and the WTRUs 102a, 102b, 102c may implement any combination of the aforementioned radio technologies. For example, the base station 114a and the WTRUs 102a, 102b, 102c may each implement dual radio technologies such as UTRA and E-UTRA, which may concurrently establish one air interface using WCDMA and one air interface using LTE-A respectively.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
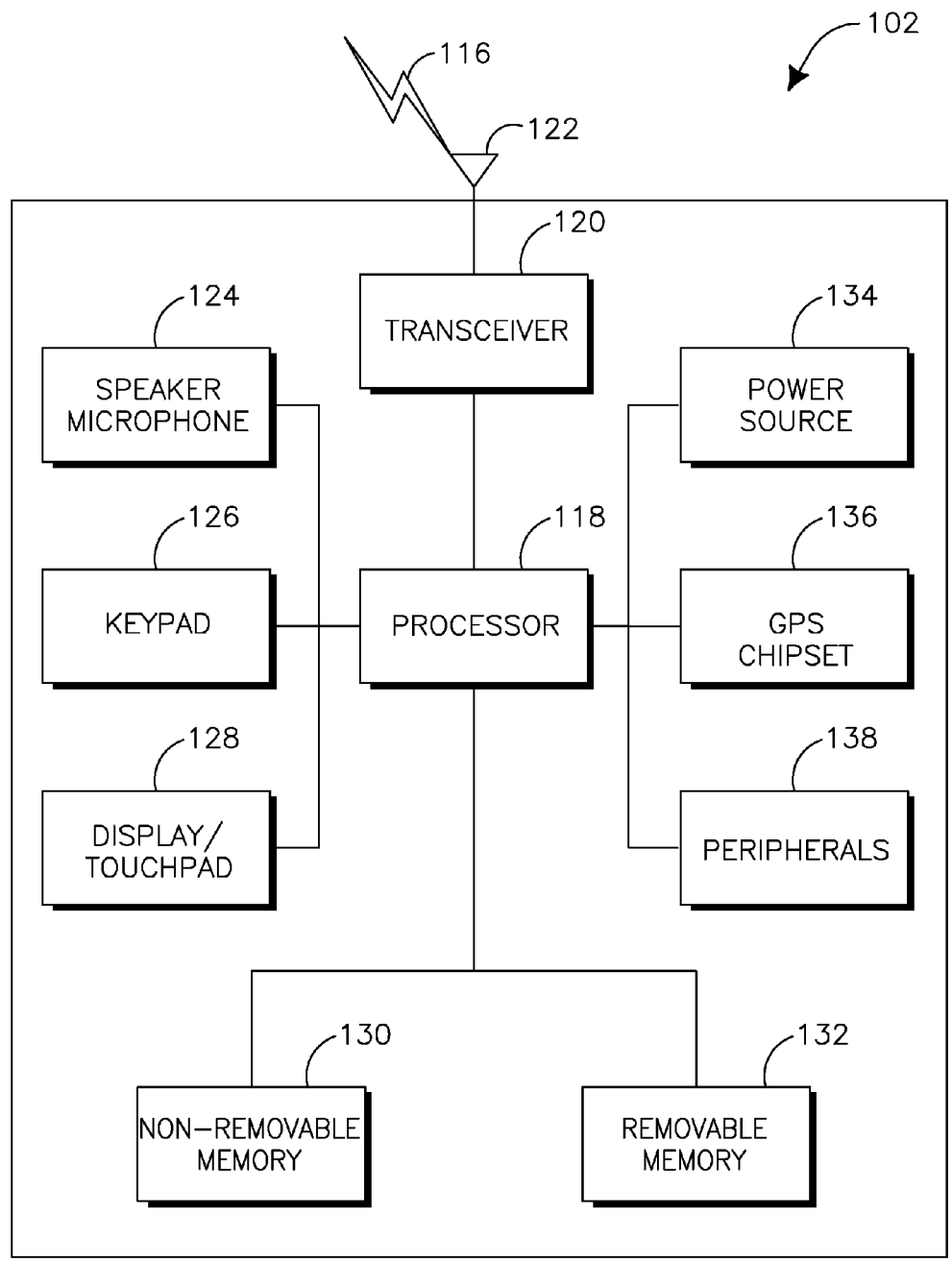
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, e.g., multiple antennas, for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128, (e.g., a liquid crystal display (LCD), display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
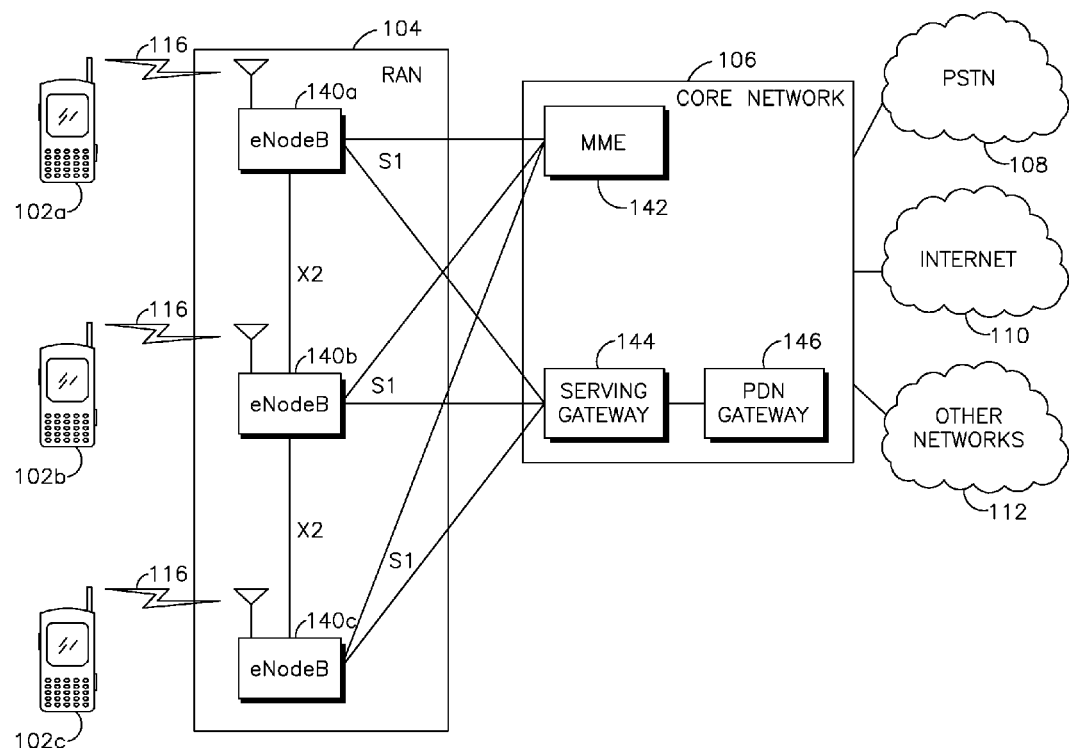
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with one or more cells (not shown), each possibly on different carrier frequencies, and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer setup/configuration/release, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

When referred to hereafter, the term "Component Carrier (CC)" includes, without loss of generality, a frequency on which the WTRU operates. For example, a WTRU may receive transmissions on a downlink CC (hereafter "DL CC"). A DL CC may include a number of DL physical channels including, but not limited to, the Physical Control Format Indicator Channel (PCFICH), the Physical Hybrid Automatic Repeat Request Indicator Channel (PHICH), the Physical Downlink Control CHannel (PDCCH), the physical multicast data channel (PMCH) and the physical downlink shared channel (PDSCH). On the PCFICH, the WTRU receives control data indicating the size of the control region of the DL CC. On the PHICH, the WTRU may receive control data indicating hybrid automatic repeat request (HARQ) acknowledgement/negative acknowledgement (ACK/NACK) feedback for a previous uplink transmission. On the PDCCH, the WTRU receives downlink control information (DCI) messages that may be used for scheduling downlink and uplink resources. On the PDSCH, the WTRU may receive user and/or control data.

In another example, a WTRU may transmit on an uplink CC (hereafter "UL CC"). An UL CC may include a number of UL physical channels including, but not limited to, the physical uplink control channel (PUCCH) and the physical uplink shared channel (PUSCH). On the PUSCH, the WTRU may transmit user and/or control data. On the PUCCH, and in some cases on the PUSCH, the WTRU may transmit uplink control information, (such as channel quality indicator/precoding matrix index/rank indication (CQI/PMI/RI) or scheduling request (SR)), and/or HARQ ACK/NACK feedback. On a UL CC, the WTRU may also be allocated dedicated resources for transmission of Sounding Reference Signals (SRS).

A DL CC may be linked to a UL CC based on the system information (SI) received by the WTRU either broadcasted on the DL CC or possibly using dedicated configuration signaling from the network. For example, when broadcasted on the DL CC, the WTRU may receive the uplink frequency and bandwidth of the linked UL CC as part of the SystemInformationBlockType2 (SIB2) information element.

When referred to hereafter, a primary CC may be a CC operating in the primary frequency in which the WTRU either performs the initial connection establishment procedure or initiates the connection re-establishment procedure, or the CC indicated as the primary CC in a handover procedure. The WTRU may use the primary CC to derive the parameters for the security functions and for upper layer system information such as NAS mobility information. Other functions that may be supported by a primary DL CC may include SI acquisition and change monitoring procedures on the broadcast channel (BCCH), and paging. A primary UL CC may correspond to the CC whose PUCCH resources are configured to carry all HARQ ACK/NACK feedback for a given WTRU. When referred to hereafter, a secondary CC may be a CC operating on a secondary frequency which may be configured once an radio resource control (RRC) connection is established and which may be used to provide additional radio resources.

In LTE Release 8 (R8), the uplink (UL) Hybrid Automatic Repeat Request (HARQ) mechanism may be used to perform retransmissions of missing or erroneous data packets transmitted by the WTRU. The UL HARQ functionality may span across both the physical (PHY) layer and the Medium Access Control (MAC) layer and operates as described herein. The WTRU may perform what the PDCCH requests, i.e., perform a transmission or a retransmission (referred to as adaptive retransmission) when a PDCCH addressed to a Cell Radio Network Temporary Identifier (C-RNTI) of the WTRU is correctly received, regardless of the content of the HARQ feedback, (ACK or NACK). When no PDCCH addressed to the C-RNTI of the WTRU is detected, the HARQ feedback may dictate how the WTRU performs retransmissions. For a NACK, the WTRU may perform a non-adaptive retransmission, i.e., a retransmission on the same UL resource as previously used by the same process. For an ACK, the WTRU may not perform any UL transmission or retransmission and keep the data in the HARQ buffer. A PDCCH may then be required to perform a retransmission, i.e., a non-adaptive retransmission may not follow.

In summary, the uplink HARQ protocol in LTE R8 may support either adaptive or non-adaptive transmissions or retransmissions. The non-adaptive HARQ may be considered the basic mode of operation in the UL. The UL HARQ operation in LTE R8 is summarized in Table 1, which shows behavior based on HARQ feedback sent on the PHICH.

TABLE 1

| HARQ feedback sent on the PHICH and seen by the WTRU | PDCCH seen by the WTRU | WTRU behavior |
| --- | --- | --- |
| ACK or NACK | New Transmission | New transmission according to PDCCH |
| ACK or NACK | Retransmission | Retransmission according to PDCCH (adaptive retransmission) |
| ACK | None | No transmission or retransmission, keep data in HARQ buffer and a PDDCH is required to resume retransmissions |
| NACK | None | Non-adaptive retransmission |

From the WTRU's perspective, the PHY layer in the WTRU may deliver an ACK/NACK that was received on the PHICH and assigned to the WTRU, to the higher layers of the WTRU as described herein. For a downlink subframe i, if a transport block is transmitted in the associated PUSCH subframe, then an ACK may be delivered to the higher layers if the ACK is decoded on the PHICH in subframe i. Otherwise, a NACK may be delivered to the higher layers.

In LTE R8, as described herein above, the PHICH may be used for transmission of HARQ feedback, (ACK or NACK), in response to an Uplink Shared Channel (UL-SCH) transmission. User multiplexing in LTE R8 may be performed by mapping multiple PHICHs on the same set of resource elements (REs) which may constitute a PHICH group. The PHICHs within the same PHICH group may be separated through different orthogonal Walsh sequences. The number of PHICH groups may be a function of DL bandwidth (BW) and may be determined by:

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{Equation (1)}$$

where $N_g \in \{1/6, 1/2, 1, 2\}$ may be provided by higher layers and $N_{RB}^{DL}$ may be the number of DL resource blocks (RBs). The term $N_g$ is a scaling factor that indicates the number of resources that may be allocated. For example, if $N_g$ is equal to two, then it signifies the maximum allowable resources that maybe configured for the system given the bandwidth. The scaling factor is nominally set by, for example, the base station using higher layer signaling. Accordingly, the maximum number of PHICH resources for normal cyclic prefix (CP) and extended CP may be calculated as shown in Table 2 and Table 3, respectively. In particular, Table 2 shows the number of PHICH groups as a function of DL BW and $N_g$ for normal CP, and Table 3 shows the number of PHICH groups as a function of DL BW and $N_g$ for extended CP.

TABLE 2

|  | 6 RBs | 15 RBs | 25 RBs | 50 RBs | 75 RBs | 100 RBs |
| --- | --- | --- | --- | --- | --- | --- |
| Ng = 1/6 | 1 | 1 | 1 | 2 | 2 | 3 |
| Ng = 1/2 | 1 | 1 | 2 | 4 | 5 | 7 |
| Ng = 1 | 1 | 2 | 4 | 7 | 10 | 13 |
| Ng = 2 | 2 | 4 | 7 | 13 | 19 | 25 |

TABLE 3

|  | 6 RBs | 15 RBs | 25 RBs | 50 RBs | 75 RBs | 100 RBs |
| --- | --- | --- | --- | --- | --- | --- |
| Ng = 1/6 | 2 | 2 | 2 | 4 | 4 | 6 |
| Ng = 1/2 | 2 | 2 | 4 | 8 | 10 | 14 |
| Ng = 1 | 2 | 4 | 8 | 14 | 20 | 26 |
| Ng = 2 | 4 | 8 | 14 | 26 | 38 | 50 |

A PHICH resource may be implicitly identified by the index pair $(n_{PHICH}^{group}, n_{PHICH}^{seq})$, where $n_{PHICH}^{group}$ may be the PHICH group number and $n_{PHICH}^{seq}$ may be the orthogonal sequence index within the group.

In order to decrease the control signaling overhead, the PHICH index pair may be implicitly associated with the index of the lowest uplink resource block used for the corresponding PUSCH transmission and the cyclic shift of the corresponding UL demodulation reference signals (DMRS) as follows:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH} \quad \text{Equation (2)}$$

where the parameters are defined as follows:

$n_{DMRS}$ is mapped from the cyclic shift in the DMRS field in the most recent downlink control information (DCI) format 0 for the transport block associated with the corresponding PUSCH transmission. It may be a three bit field and for a single user configuration, $n_{DMRS}$ may be set to zero. For a semi-persistently configured PUSCH transmission on subframe n in the absence of a corresponding PDCCH with a DCI Format 0 in subframe n–$k_{PUSCH}$ or a PUSCH transmission associated with a random access response grant, $n_{DMRS}$ is set to zero where $k_{PUSCH}$=4 for FDD transmissions;

$N_{SF}^{PHICH}$ is the spreading factor size used for PHICH modulation defined as a function of cyclic prefix;

$I_{PRB\_RA}^{lowest\_index}$ is the lowest physical RB index in the first slot of the corresponding PUSCH transmission;

$N_{PHICH}^{group}$ is the number of PHICH groups configured by higher layers; and $$I_{PHICH} = \begin{cases} 1 & \text{for TDD UL/DL configuration 0 with PUSCH transmission in subframe } n = 4 \text{ or } 9 \\ 0 & \text{otherwise} \end{cases}$$

The association of PHICH resources and the cyclic shifts may enable the allocation of the same time and frequency resource to several WTRUs in support of uplink Multi-User Multiple Input Multiple Output (MU-MIMO).

Figure 2A:
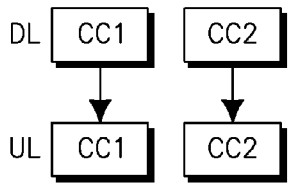
FIGS. 2(A), 2(B) and 2(C) illustrate three different configurations for carrier aggregation.
Figure 2B:
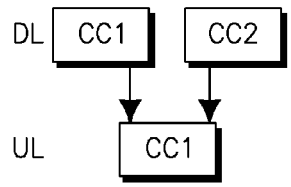
Figure 2C:
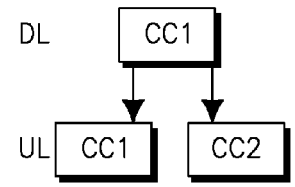

In LTE-Advanced (LTE-A), carrier aggregation may be used. The WTRU may be configured to aggregate a different number of CCs of possibly different bandwidths in the UL and the DL. Three example configurations for LTE-A carrier aggregation are illustrated in FIGS. 2(A), 2(B) and 2(C). FIG. 2(A) illustrates a symmetric carrier aggregation, FIG. 2(B) illustrates multiple DL CCs with one UL CC, and FIG. 2(C) illustrates one DL CC with multiple UL CCs. In these multi-carrier systems, a PDCCH on a CC may assign PDSCH or PUSCH resources in one of multiple CCs using a carrier indicator field (CIF). The latter may be realized by extending DCI formats with a 3-bit CIF. As for the HARQ feedback transmission, it may be assumed that PHICH is transmitted on the DL CC that is used to transmit the UL grant.

In LTE-A, cross-carrier scheduling may be used and may include cross-carrier PHICH resource allocation. In these systems, a PHICH may be transmitted on a DL CC that may be associated with multiple UL CCs. If the PHICH is linked to two or more PUSCHs, then application of the LTE R8 PHICH parameter selection for resources may lead to ambiguities and collisions. For example, UL transmissions on two or more CCs may be scheduled by the same DL CC. In this example, if the PUSCH transmissions on two or more CCs use the same lowest PRB index, $I_{PRB\_RA}^{lowest\_index}$, the association of a PHICH resource in the DL, and the lowest PRB index used for PUSCH transmission in the UL in accordance with LTE R8 may not be unique and a PHICH resource collision may occur. In fact, assuming a non-adaptive HARQ operation, multiple HARQ processes at the base station may attempt to transmit their corresponding feedback information on the same PHICH resource which may result in PHICH resource collisions.

Several solutions offered to address the problem are insufficient. For example, one solution may semi-statically configure UL carrier-specific PHICH resource offsets. However, this alternative requires a large number of PHICH resources, e.g., one set per UL carrier. Another solution may be based on a system-wide indexing of PRB and PHICH resources, starting from WTRUs and continuing for LTE-A WTRUs. The shortcoming of this alternative is that the solution is not backward compatible and hence LTE R8 and LTE Release 10 (R10) or LTE-A WTRUs cannot coexist. Further, it has been suggested that where some UL CC transmissions use the same first PRB index, the collision may be avoided by using different DMRS cyclic shifts as in LTE R8. However, this approach may limit the UL MU-MIMO capabilities of LTE-A as compared to that of LTE R8. In fact, in LTE-A, the cyclic shifts may be consumed by configuring MU-MIMO transmissions, hence using cyclic shifts to avoid PHICH collisions may result in UL system throughput loss.

The following embodiments identify solutions, some of which may involve implicit PHICH mapping schemes, to address channel resource mapping and the PHICH mapping ambiguity issue. The solutions may be applicable to assigning radio resources generally, to Frequency Division Duplex (FDD) or to Time Division Duplex (TDD) modes of operation in LTE-A, or to any combination of radio resource technologies.

Any or all of the methods and embodiments outlined below may be supported by the WTRU to address the identified problems. The methods and embodiments may also be supported by the base station in addition to those identified as applicable to the WTRU.

In an example method, the existing PHICH resource groups may be divided, and assigned to different UL CCs by the scheduler at, for example, the base station. For illustrative purposes only, a PHICH mapping rule may be determined by $$n_{PHICH,n_{CI}}^{group} = (I_{PRB\_RA}^{lowest\_index} + n_{DMRS}) \bmod (\lfloor N_{PHICH}^{group}/N_{CC} \rfloor) + n_{CI} \lfloor N_{PHICH}^{group}/N_{CC} \rfloor)$$

$$n_{PHICH}^{seq} = (\lfloor I_{PRB\_RA}^{lowest\_index}/(\lfloor N_{PHICH}^{group}/N_{CC} \rfloor) \rfloor + n_{DMRS}) \bmod 2N_{SF}^{PHICH} \quad \text{Equation (3)}$$

where the parameters above are defined as follows:

$n_{PHICH,n_{CI}}^{group}$ may be the number of the PHICH groups assigned to the $n_{CI}$ th UL CC;

$n_{PHICH}^{seq}$ may be the orthogonal sequence index within the group;

$n_{CI}$ may be the index of the UL CC used for transmission of the corresponding PUSCH;

$n_{DMRS}$ may be mapped from the cyclic shift in DMRS field in the most recent DCI format 0 for the transport block associated with the corresponding PUSCH transmission;

$N_{SF}^{PHICH}$ may be the spreading factor size used for PHICH modulation defined as a function of cyclic prefix;

$I_{PRB\_RA}^{lowest\_index}$ may be the lowest physical RB index in the first slot of the corresponding PUSCH transmission;

$N_{PHICH}^{group}$ may be the number of PHICH groups configured by higher layers; and $N_{CC}$ may denote the number of UL CCs linked to a single DL CC.

Three of the above described parameters, namely $n_{PHICH}^{group}$, $n_{PHICH}^{seq}$, and $n_{CI}$, may be determined by decoding the PDCCH on the associated DL CC using the WTRU specific C-RNTI to read the DCI format 0 granting the PUSCH transmission, (assuming that a CIF exists).

In this method, an assumption may be that $N_g=2$, so as to maximize the number of available PHICH groups. Other values may be possible depending on the number of aggregated UL CCs. As shown in Table 2, the number of PHICH groups may also be a function of the DL BW. Accordingly, the maximum number of aggregated CCs that may be supported when the DL bandwidth is 6 RBs and 12 RBs may be two and four, respectively.

In a variation of the example method, an assumption may be that $N_g=\frac{1}{4}$, such that there may only be one PHICH group available for BWs up to 25 RBs. Thus, the PHICH groups may not be divided and dedicated to different carriers. However, this may be resolved by dividing the total PHICH resources or PHICH channels instead of PHICH groups. For example, the total number of PHICH channels for $N_g=\frac{1}{4}$ may be eight. Eight PHICH channels may be divided into several divisions, each of which may then be associated with a CC. Moreover, for some other configurations such as $N_g=\frac{1}{2}$ or $N_g=1$, the number of PHICH groups may be two and four respectively, thus the maximum number of carriers which may be supported is limited to two and four carriers, respectively. Again, this may be resolved by dividing the total number of PHICH resources or channels instead of PHICH groups. Table 4 shows the number of PHICH groups and number of PHICH channels that may be divided among carriers with different $N_g$ configurations for a 5 MHz bandwidth.

TABLE 4

|  | Ng = ¼ | Ng = ½ | Ng = 1 | Ng = 2 |
| --- | --- | --- | --- | --- |
| Number of PHICH groups | 1 | 2 | 4 | 7 |
| Number of PHICH channels | 8 | 16 | 32 | 56 |

This example method may include any possible division of channel resources, PHICH resources, channels, groups, or combination thereof. Each division may be configured for, or assigned to, a particular CC.

Figure 3:
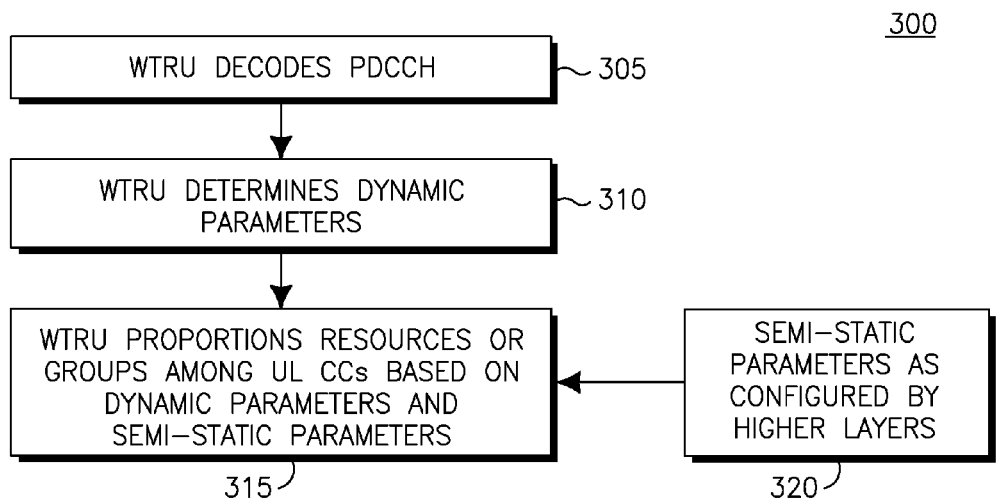
FIG. 3 is a flowchart for an example method where physical hybrid automatic repeat request (HARQ) indicator channel (PHICH) resources or groups are divided and associated with component carriers.

FIG. 3 shows a flowchart 300 illustrating the example method. A WTRU decodes a PDCCH on an associated DL CC using, for example, a WTRU specific C-RNTI for a UL CC that may be assigned to the WTRU for UL transmission (305). The WTRU then determines a set of dynamic parameters, for example, $I_{PRB\_RA}^{lowest\_index}$, $n_{DMRS}$ and $n_{CI}$ (310). Using a set of semi-static parameters configured by higher layers, such as for example, $N_{CC}$ and $N_{SF}^{PHICH}$ (320), and the dynamic parameters, the WTRU distributes the resources, groups or a combination thereof proportionately among the UL CCs (315). This may be evenly or unevenly proportioned among the UL CCs. In particular, the WTRU may determine the number of the PHICH group assigned to a UL CC and the sequence index number with the group, e.g., $n_{PHICH}^{group}$, $n_{PHICH}^{seq}$, in accordance with, for example, the mapping rule of Equation (3).

In another method, it is assumed that in order to increase the user capacity under carrier aggregation, a WTRU may be allocated more than one RB on a given CC. However, there may still be a one-to-one mapping between each PHICH resource and the PRB index used for a PUSCH transmission. Thus, there may be unused PHICH resources available that are not assigned for HARQ feedback transmissions. These spare or vacant PHICH resources may be utilized for PHICH resource collision avoidance. Thus, in this example method, a basic assumption may be made that each user's assignment on each UL CC in terms of the number of RBs may be greater than or equal to the number of aggregated UL CCs or the number of transport blocks. Stated differently, $L_{RBs} \geq N_{CC}$, where $N_{CC}$ may denote the number of aggregated UL CCs linked to a single DL CC and $L_{RBs}$ may be the length of contiguously or non-contiguously allocated RBs to a WTRU per CC.

The WTRU may use the following mapping formula by replacing the $I_{PRB\_RA}^{lowest\_index}$ parameter in Equation (2) with $(I_{PRB\_RA}^{lowest\_index} + \Delta_i)$, thereby resulting in the following equation:

$$n_{PHICH,i}^{group} = ((I_{PRB\_RA}^{lowest\_index} + \Delta_i) + n_{DMRS}) \bmod N_{PHICH}^{group} + I_{PHICH} N_{PHICH}^{group}$$

$$n_{PHICH,i}^{seq} = (\lfloor (I_{PRB\_RA}^{lowest\_index} + \Delta_i)/N_{PHICH}^{group} \rfloor + n_{DMRS}) \bmod 2N_{SF}^{PHICH} \quad \text{Equation (4)}$$

where the additional parameters above are defined as follows:
$I_{PRB\_RA}^{lowest\_index}$ may be the lowest PRB index in the first slot of the corresponding PUSCH transmission; and
$\Delta_i$ may be a CC dependent offset or an offset associated with the index of the transport block which may be applied to $I_{PRB\_RA}^{lowest\_index}$, and may be identified as the collision avoidance parameter. The $\Delta_i$ parameter may be used to uniquely link a PRB index within the contiguously or non-contiguously allocated RBs of a WTRU to a different CC in order to avoid PHICH resource collision. For example, the $\Delta_i$ points to the extra or vacant resources in the primary CC. For a system with $N_{RB}$ RBs, the parameter $\Delta_i$ may take the following values:

$\Delta_i \in \{0, 1, \ldots, N_{RB}-1\}$.

The parameter $\Delta_i$ may either be configured and communicated to the WTRU through higher layer signaling or identified by the WTRU according to a pre-specified mapping rule based on its PRB allocations. To realize the latter, one possible mapping rule may be to sequentially associate the PRB indices within an allocated UL grant on one of the UL CCs to a sequence of PHICH resources and then transmit the HARQ feedbacks corresponding to multiple UL CCs using these PHICH resources. For instance, the PHICH resource associated with the PUSCH transmission on UL $CC_0$ may be linked to the lowest PRB index from the set of PRBs allocated to the WTRU (i.e., $I_{PRB\_RA}^{lowest\_index}$), the PHICH resource associated with the PUSCH transmission on UL $CC_1$ may be linked to the second lowest PRB index from the set of PRBs allocated to the WTRU, and so on, (such that the assignments may incrementally continue for all UL CCs).

Figure 4:
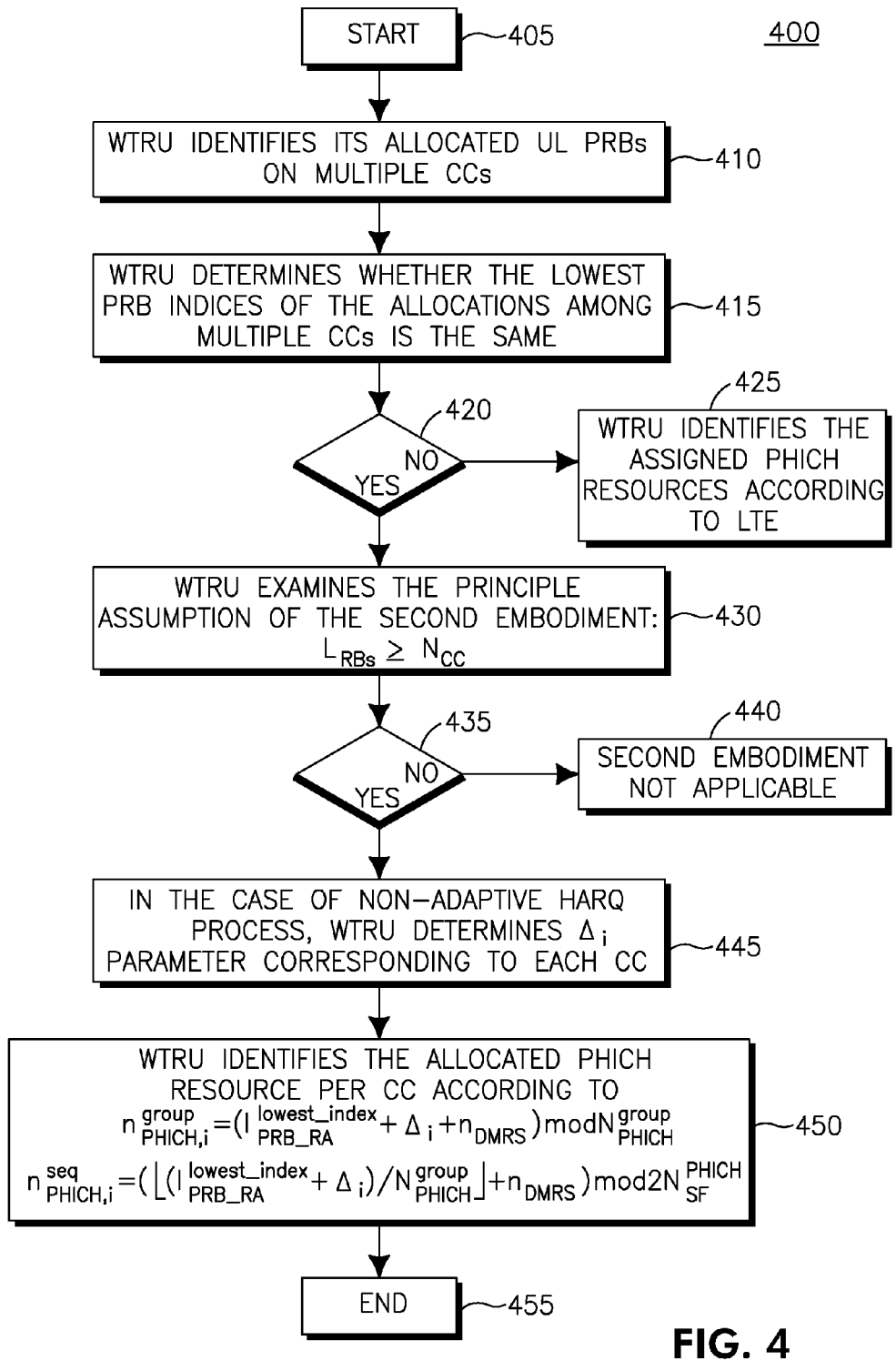
FIG. 4 is a flowchart for non-adaptive HARQ procedures at the WTRU.

FIG. 4 is a flowchart 400 for the non-adaptive HARQ procedures at the WTRU based on the example method associated with Equation (4). The method starts with the WTRU decoding a PDCCH on a DL CC that may contain resource information for the CCs (405). The allocated UL PRBs for the multiple CCs are then identified (410). The WTRU then determines if the lowest PRB indices of the PRB allocations among the multiple CCs are the same (415). If there are no collisions (420), then the WTRU identifies the assigned PHICH resources in accordance with the LTE R8 method described herein (425). If there are potential collisions, then the WTRU determines if the number of RBs is greater than or equal to the number of CCs (430). If there are more CCs than RBs, then the method associated with Equation (4) is inapplicable (440). In this case, other methods described herein may be used. If the number of RBs is greater than or equal to the number of CCs, then the WTRU determines the collision avoidance factor A for each CC or transport block with respect to the primary UL CC (445). The PHICH group number for each UL CC and the orthogonal sequence index within the PHICH group are then determined by the WTRU in accordance with Equation (4) (450) and the method completes (455).

Figure 5:
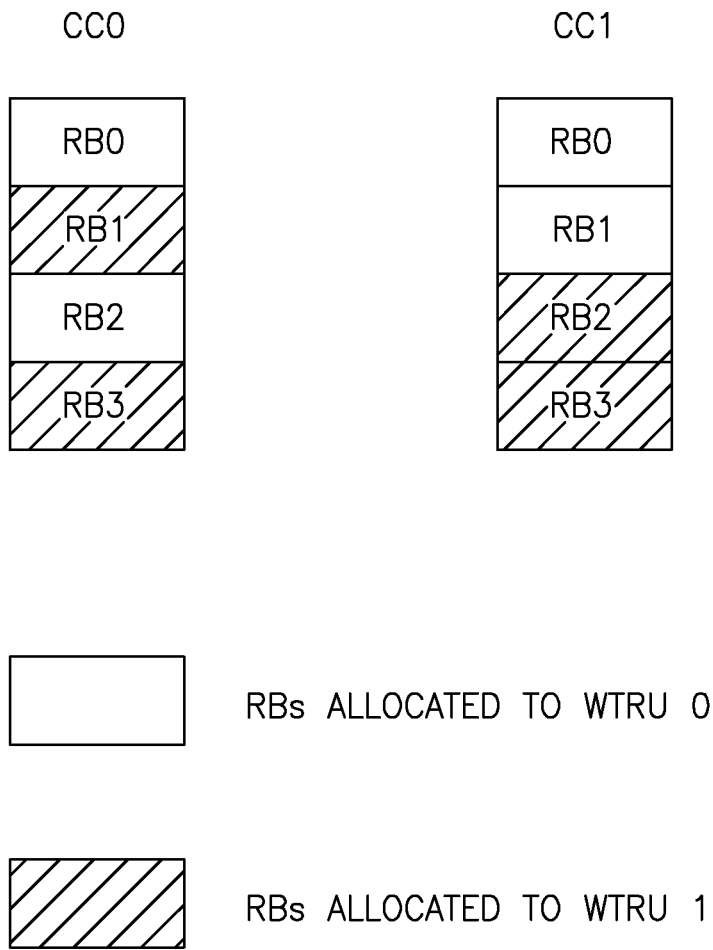
FIG. 5 is an example diagram of both contiguous and non-contiguous resource allocations for two users with two uplink component carriers.

FIG. 5 illustrates an example using the method illustrated in FIG. 4. As shown in FIG. 5, two users, $WTRU_0$ and $WTRU_1$, may be allocated two RBs on each CC in a system having two aggregated UL CCs, $CC_0$ and $CC_1$. Both users may be allocated two non-contiguous RBs on $CC_0$ and two contiguous RBs on $CC_1$. In other words, each user, $WTRU_0$ and $WTRU_1$, may be configured to transmit two transport blocks, one on $CC_0$ and $CC_1$. Each user is therefore expecting to receive feedback information related to the transmitted transport blocks on a PHICH carried by a DL CC. Application of LTE R8 processing would lead to a PHICH resource collision as the WTRUs are expecting ACK/NACKs for each transport block transmission. For example, $RB_0$ would be used for sending an ACK/NACK for transport block 1 and transport block 2 for $WTRU_0$ and $RB_1$ would be used for sending an ACK/NACK for transport block 1 and transport block 2 for $WTRU_1$. However, using the method of FIG. 4 and given the above PHICH collision, each WTRU determines if the number of allocated resources is greater than or equal to the number of CCs. In this example, this is true for each WTRU. Each WTRU would then calculate a collision avoidance factor for the number of CCs with respect to the primary UL CC, which in this example is $CC_0$. In this example, $WTRU_0$ may then expect to receive its HARQ feedbacks on PHICH resources that are linked to $RB_0$ and $RB_2$ for the two transport blocks that are transmitted on $CC_0$ and $CC_1$, respectively, (i.e., $WTRU_0$ may determine $\Delta_i \in \{0,2\}$). As for $WTRU_1$, it may expect to receive its HARQ feedbacks on PHICH resources that are linked to $RB_1$ and $RB_3$ for the two transport blocks that are transmitted on $CC_0$ and $CC_1$, respectively, (i.e., $WTRU_1$ may determine $\Delta_i \in \{1,3\}$).

Another method for PHICH resource collision avoidance may be based on a network-configured solution. More specifically, in the case of PHICH resource collisions, the base station may force all HARQ feedback corresponding to all UL CCs except for one to be transmitted on the PDCCH. A result of this approach may be that an adaptive mode of operation is dictated to a number of the HARQ processes while only one of the HARQ processes may be based on the non-adaptive HARQ process. For purposes of backward compatibility, in the event that the PHICH resources are shared by both LTE R8 and LTE-A WTRUs, the available PHICH resource may be assigned to the LTE R8 WTRU. This method uses non-adaptive HARQ processing and adaptive HARQ processing in a complementary manner to implement PHICH resource collision avoidance.

Figure 6:
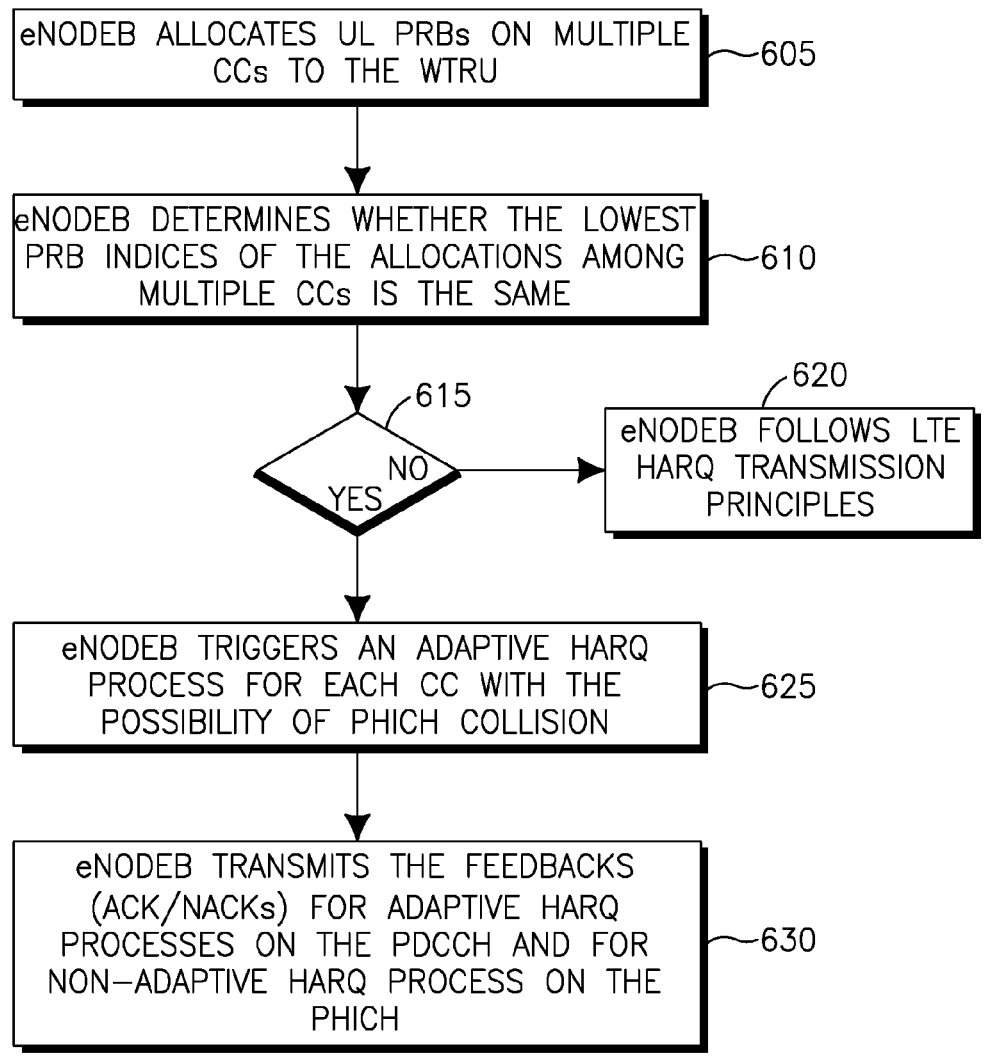
FIG. 6 is a flowchart illustrating HARQ procedures at the base station; and 125

FIG. 6 is a flowchart 600 for HARQ procedures at the base station based on the network-configured method. Initially, the base station may allocate UL PRBs on multiple CCs configured at the WTRU (605). The base station then determines whether the lowest PRB indices of the PRB allocations among the multiple CCs are the same (610). If the lowest indices of the PRB allocations are not the same among the multiple CCs (615), then the base station may follow the LTE R8 HARQ transmission method described herein (620). If the lowest PRB indices of the PRB allocations are the same, then the base station triggers an adaptive HARQ process for each CC that has the possibility of a PHICH collision (625). The base station may transmit the appropriate feedbacks, ACK/NACKs, for adaptive HARQ processes on the PDCCH and for non-adaptive HARQ processes on the PHICH (630).

Before reviewing the network-configured method from perspective of the WTRU, note that in LTE R8 there is one HARQ entity that maintains a number of parallel HARQ processes at the WTRU. In order to support carrier aggregation in LTE-A, it may be assumed that a HARQ process may be dedicated to each UL CC.

The behavior at the WTRU and in particular at the MAC layer is now described. At a transmission time interval (TTI) for which the HARQ entity at the WTRU may expect to receive feedback transmissions, (ACK/NACK information), corresponding to any UL CC, the WTRU may first conduct a search for the PDCCH DCI format 0/0x on the DL CC on which an initial UL grant has been transmitted. Note that DCI Format 0x represents the UL grant for single user (SU)-MIMO (SU-MIMO) transmission mode. If a UL grant addressed to the C-RNTI (or Semi-Persistent Scheduling C-RNTI) of the WTRU is detected for a CC, the HARQ entity may identify the corresponding HARQ process for which a transmission has taken place and then route the received ACK/NACK information to the appropriate HARQ process. When no PDCCH DCI format 0/0x addressed to the C-RNTI of the WTRU is detected for a given CC, the HARQ entity may attempt to obtain the feedback information transmitted in the PHICH and then route the content of the HARQ feedback, (ACK or NACK), to the appropriate HARQ process. With respect to PHICH, the PHY layer in the WTRU may deliver certain information to the higher layers.

In particular, for downlink subframe i, if a transport block was transmitted in the associated PUSCH subframe then an ACK may be delivered to the higher layers if ACK is decoded on the PHICH in subframe i. Otherwise, a NACK may be delivered to the higher layers if a NACK is decoded on the PHICH in subframe i. If, no PHICH is detected in subframe i, a WTRU may indicate the absence of PHICH to the higher layers. This is summarized in Table 5.

TABLE 5

For downlink subframe i, if a transport block was transmitted in the associated PUSCH subframe then:
   if ACK is decoded on the PHICH in subframe i,
     ACK shall be delivered to the higher layers;
   else, if NACK is decoded on the PHICH in subframe i,
     NACK shall be delivered to the higher layers;
   else, no PHICH was detected in subframe i,
     UE shall indicate the absence of PHICH to the higher layers.

A result of the network-configured method may be the increased control channel overhead due to the additional PDCCH transmissions which may be the direct consequence of forced adaptive HARQ transmissions for some of the feedback transmissions. However, the probability of having PHICH collisions may be relatively low for an appropriately designed DL scheduler at the base station. Hence, it may not be expected for the base station to be forced to initiate many adaptive HARQ retransmissions at a given TTI. This method may in fact minimize the impact on standardization efforts as it may only require insertion of the procedures in the R8 HARQ processes.

Figure 7:
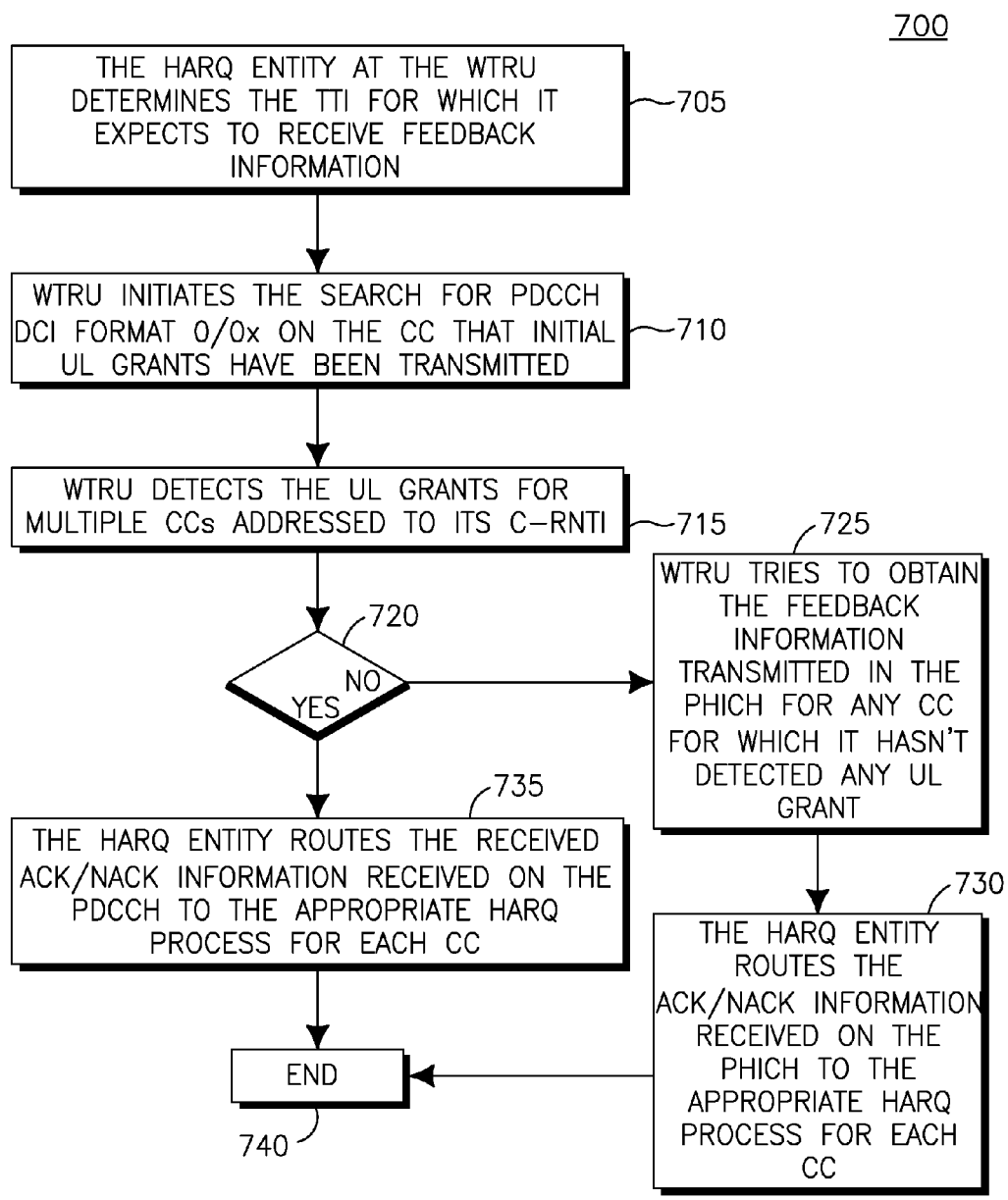
FIG. 7 is a flowchart illustrating HARQ procedures at the WTRU.

FIG. 7 is a flowchart 700 for WTRU behavior in accordance with the network-configured method. Initially, the HARQ entity at the WTRU determines the TTI for which it expects to receive feedback information (705). The WTRU then initiates a search for the PDCCH DCI format 0/0x on the CC that the initial UL grants have been transmitted on (710). The WTRU then attempts to detect the UL grants for each CC as addressed by the WTRU's C-RNTI (715). If no PDCCH DCI format 0/0x addressed to the C-RNTI of the WTRU is detected for a given CC (720), the WTRU may attempt to obtain the feedback information transmitted in the PHICH (725). The HARQ entity may then route the content of the HARQ feedback, (ACK or NACK), to the appropriate HARQ process for each CC (730). The process then completes (740). If a UL grant addressed to the C-RNTI (or Semi-Persistent Scheduling C-RNTI) of the WTRU is detected for a CC, the HARQ entity may identify the corresponding HARQ process for which a transmission has taken place and then route the received ACK/NACK information to the appropriate HARQ process (735). The process then completes (740).

Described now is a method that addresses the problems associated with the cyclic shift based approach to avoid PHICH collisions. The method addresses the issue when two or more users may be semi-persistently configured on multiple UL component carriers or assigned random access response grants on multiple UL component carriers.

In particular, for a semi-persistently configured PUSCH transmission in the absence of a corresponding PDCCH with a DCI Format 0 or for a PUSCH transmission associated with a random access response grant, the variable $n_{DMRS}$ is set to zero. This may imply that if two or more semi-persistently co-scheduled users share the same lower resource block on UL component carriers that receive their grants from the same DL component carrier for their PUSCH transmissions, then all these co-scheduled users may be assigned the same cyclic shift for their UL DMRS, (i.e., $n_{DMRS}=0$). Accordingly, by relying on a cyclic-shift-based solution, the PHICH collisions may be inevitable.

In the case of a semi-persistently configured PUSCH transmission on subframe n in the absence of a corresponding PDCCH with a DCI Format 0 in subframe $n-k_{PUSCH}$, the WTRU may determine its $n_{DMRS}$ based on the information in the most recent grant that assigns the semi-persistent resource allocation. With respect to the base station, the scheduler may schedule such that co-scheduled WTRUs on multiple UL CCs are assigned different first resource blocks as part of their initial semi-persistently scheduled PUSCH.

In the case of a PUSCH transmission associated with a random access response grant, the scheduler may configure co-scheduled WTRUs on multiple UL CCs such that the WTRUs are assigned different first resource blocks as part of their random access response grant. This may lead to different PHICH resources and thus avoids collisions of PHICH resources originating from different UL CCs.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented at a base station for avoiding feedback channel resource collision, comprising:
   determining a feedback channel resource collision; and
   forcing an adaptive feedback channel process for each uplink component carrier having a feedback channel resource collision.

2. The method of claim 1, wherein feedback channel resource collision determination checks sameness of lowest resources allocated among an uplink component carriers.

3. The method of claim 1, wherein a non-adaptive feedback channel process is used for one uplink component carrier having a feedback channel resource collision.

4. A base station configured to avoid feedback channel resource collision, comprising:
   a processor configured to determine a feedback channel resource collision; and
   the base station configured to force an adaptive feedback channel process for each uplink component carrier having a feedback channel resource collision.

5. The base station of claim 4, wherein feedback channel resource collision determination checks sameness of lowest resources allocated among an uplink component carriers.

6. The base station of claim 4, wherein a non-adaptive feedback channel process is used for one uplink component carrier having a feedback channel resource collision.

* * * * *

UNITED STATES PATENT AND TRADEMARK OFFICE
CERTIFICATE OF CORRECTION

PATENT NO. : 8,867,478 B2
APPLICATION NO. : 12/986407
DATED : October 21, 2014
INVENTOR(S) : Shahrokh Nayeb Nazar et al.

It is certified that error appears in the above-identified patent and that said Letters Patent is hereby corrected as shown below:

In claim 2, line 3, after the word "among", delete "an".
In claim 5, line 18, after the word "among", delete "an".

Signed and Sealed this
Seventh Day of June, 2016

Michelle K. Lee
*Director of the United States Patent and Trademark Office*